(12) United States Patent
Takaoka

(10) Patent No.: US 7,606,949 B2
(45) Date of Patent: Oct. 20, 2009

(54) MULTIFUNCTION MACHINE AND A CONTROL METHOD OF THE MULTIFUNCTION MACHINE

(75) Inventor: Tatsuo Takaoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 81 days.

(21) Appl. No.: 11/898,128

(22) Filed: Sep. 10, 2007

(65) Prior Publication Data
US 2008/0071938 A1    Mar. 20, 2008

(30) Foreign Application Priority Data
Sep. 19, 2006    (JP)  ............... 2006-252852

(51) Int. Cl.
*G06F 3/00*    (2006.01)
(52) U.S. Cl. ............... 710/15; 710/16; 710/17
(58) Field of Classification Search ............. 710/15–17
See application file for complete search history.

(56) References Cited

U.S. PATENT DOCUMENTS
2007/0113276 A1*    5/2007    Shoji et al. ................ 726/17

FOREIGN PATENT DOCUMENTS
| JP | 2004-070423 | 3/2004 |
| JP | 2004-109765 | 4/2004 |
| JP | 2004-168052 | 6/2004 |
| JP | 2005-341518 | 12/2005 |
| JP | 2006-018660 | 1/2006 |
| JP | 2006-059228 | 3/2006 |
| JP | 2006-172074 | 6/2006 |

* cited by examiner

*Primary Examiner*—Alford W Kindred
*Assistant Examiner*—David E Martinez
(74) *Attorney, Agent, or Firm*—Harness, Dickey & Pierce, P.L.C.

(57) ABSTRACT

A multifunction machine having an interface unit for controlling a USB, and a control method of the multifunction machine are disclosed. The multifunction machine includes
   a management unit for managing history information that includes information about use of a USB memory attached to and detached from the interface unit, and
   a detecting unit for detecting whether the USB memory is attached to the interface unit, wherein the history information managed by the management unit includes information about attachment/detachment history detected by the detecting unit.

8 Claims, 10 Drawing Sheets

FIG.2

(a) USB MEMORY ATTACH/DETACH HISTORY

| DATE AND TIME | STATUS |
|---|---|
| 2006/4/20 12:20 | ATTACHED |
| 2006/4/20 13:20 | ATTACHED |
| 2006/4/20 14:20 | ATTACHED |
| 2006/4/20 15:20 | DETACHED |
| | |
| | |
| | |

(b) USB MEMORY ATTACH/DETACH HISTORY

| DATE AND TIME | STATUS |
|---|---|
| 2006/4/20 12:15 | ATTACHED |
| 2006/4/20 15:18 | DETACHED |
| 2006/4/20 16:43 | ATTACHED |
| | |
| | |
| | |
| | |

(c) USB MEMORY ATTACH/DETACH HISTORY

| DATE AND TIME | STATUS | USER |
|---|---|---|
| 2006/4/20 12:20 | ATTACHED | UNCERTAIN |
| 2006/4/20 13:20 | ATTACHED | PERSON A |
| 2006/4/20 14:20 | ATTACHED | PERSON B |
| 2006/4/20 15:20 | DETACHED | UNCERTAIN |
| | | |
| | | |
| | | |

(d) USB MEMORY ATTACH/DETACH HISTORY

| DATE AND TIME | STATUS | USER |
|---|---|---|
| 2006/4/20 12:15 | ATTACHED | PERSON A |
| 2006/4/20 12:18 | DETACHED | PERSON A |
| 2006/4/20 16:43 | ATTACHED | PERSON B |
| | | |
| | | |
| | | |
| | | |

(e)

| DATE AND TIME | USER | SERVICE | USB IDENTIFIER MATCHING |
|---|---|---|---|
| 2006/4/20 12:16 | PERSON A | SCAN To USB | OK |
| 2006/4/20 15:22 | PERSON C | USB To PRINT | ERROR (UNMATCHED) |
| 2006/4/20 16:45 | PERSON B | USB To PRINT | OK |
| | | | |
| | | | |

(f)

| DATE AND TIME | USER | SERVICE | USB IDENTIFIER MATCHING | SCRAMBLING |
|---|---|---|---|---|
| 2006/4/20 12:16 | PERSON A | SCAN To USB | OK | ON |
| 2006/4/20 15:22 | PERSON C | USB To PRINT | ERROR (UNMATCHED) | UNCERTAIN |
| 2006/4/20 16:45 | PERSON B | USB To PRINT | OK | ON |
| | | | | |

MULTIFUNCTION MACHINE AND A CONTROL METHOD OF THE MULTIFUNCTION MACHINE

BACKGROUND OF THE INVENTION

1. Field of the Invention

The present invention generally relates to a multifunction machine and a control method of the multifunction machine; and especially relates to a multifunction machine that includes an interface unit for controlling a USB (Universal Serial Bus) such that services using a USB memory may be available, and a control method of the multifunction machine.

2. Description of the Related Art

In recent years and continuing, a data storage connected by the USB, namely a USB memory, is widely spread for storing data, and for data transfer between personal computers (PCs). The USB memory is often used for storing files of applications such as PDF (Portable Document Format), Microsoft Word (trademark), Microsoft Excel (trademark), and other electronic documents (document generally drawn up with the PC). For transferring documents such as described, floppy disks (FD), compact disks (CD), and the like are used. Recently, a storage that is smaller sized and detachable is often used.

Further, a recent trend is that conventional single functional machines (a copier, a facsimile apparatus, a scanner, a printer, etc.) are shifted to an All-In-One (AIO) apparatus. The AIO apparatus is also called a multifunction machine.

Features of the USB include the following points. Namely,
It is standardized for a wide variety of instruments.
The instruments are connected to a PC through a common connector.
Plug-and-play is possible, and detachable.
A maximum of 127 USB instruments can be connected to one host controller.

While the USB has the advantages as described above, it also has a problem. That is, since it is detachable, a malicious third person may take out the USB memory that contains information such as document information and function-setting information.

As for known techniques relevant to the present invention, Patent References 1 and 2 can be cited.
[Patent Reference 1] JPA 2004-070423
[Patent Reference 2] JPA 2004-109765

DISCLOSURE OF INVENTION

Objective of Invention

Patent Reference 1 discloses means for realizing a physical interface when using the USB. Patent Reference 2 discloses an instrument that includes an interface to a USB device, and a USB controller, wherein authentication is provided by an authentication server through a network.

However, Patent References 1 and 2 do not consider at all about an improvement in traceability of stored information leakage that may take place when the USB is used in a multifunction machine (AIO instrument).

SUMMARY OF THE INVENTION

In view of the situation described above, the present invention provides a multifunction machine, and a control method of the multifunction machine wherein the traceability of the information leakage that may take place when the USB is used is improved.

The present invention provides a multifunction machine, and a control method of the multifunction machine that substantially obviate one or more of the problems caused by the limitations and disadvantages of the related art.

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by a multifunction machine, and a control method of the multifunction machine particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides a multifunction machine, and a control method of the multifunction machine as follows.

Means for Solving Problem

An aspect of the embodiment provides a multifunction machine that includes an interface unit for controlling a USB, and a management unit for managing history information about a detachable USB memory being used with the multifunction machine, which USB memory is connected/disconnected (attached/detached) to/from the interface unit.

According to another aspect of the embodiment, the multifunction machine includes an attach/detach detecting unit for detecting when the USB memory is attached to and detached from the interface unit, and the history information includes history of attaching/detaching the USB memory to/from the interface unit, which information is provided by the attach/detach detecting unit.

According to another aspect of the embodiment, the management unit of the multifunction machine identifies and authenticates a user of a service of the multifunction machine, which service is related to (uses) the USB memory, wherein the user identification is managed in association with the history of attaching/detaching the USB memory to/from the interface unit.

According to another aspect of the embodiment, the multifunction machine is capable of allowing and disallowing a user to use the service that uses the USB memory only if user identification that is input prior to offering the service of the multifunction machine using the USB memory is in agreement with identification information read from the USB memory attached to the interface unit.

According to another aspect of the embodiment, the history information managed by the management unit of the multifunction machine includes information about a collation result of the identification information and/or information about a kind of the service using the USB memory, which service is provided to the user.

According to another aspect of the embodiment, a control method of realizing the above-described functions of the multifunction machine is provided.

Effectiveness of Invention

Since, according to the embodiment of the present invention, use history of a USB memory is held for reviewing when required, traceability at the time of an information leak is improved.

Since, according the embodiment of the present invention, history of attaching/detaching the USB memory is held for reviewing when required, traceability (date/time of attaching/detaching) at the time of an information leak is improved.

Since, according the embodiment of the present invention, the user of the service using the USB memory is identified, traceability (date/time of attaching/detaching, and person that attaches/detaches) at the time of an information leak is further improved.

According to another aspect of the embodiment, since the multifunction machine is capable of allowing only a specific USB memory to be used, an information leak is prevented.

According to another aspect of the embodiment, since the multifunction machine is capable of storing information about the collation result of the identification of the USB memory (match or un-match), the kind of service provided because the identification is in agreement, and/or the kind of service not provided because the identification is not in agreement, the traceability at the time of an information leak is further improved.

BRIEF DESCRIPTION OF THE DRAWINGS

FIG. 2 shows various management forms of history information relevant to use of a USB memory 9;

DESCRIPTION OF THE PREFERRED EMBODIMENTS

In the following, embodiments of the present invention are described with reference to the accompanying drawings.

Figure 1:
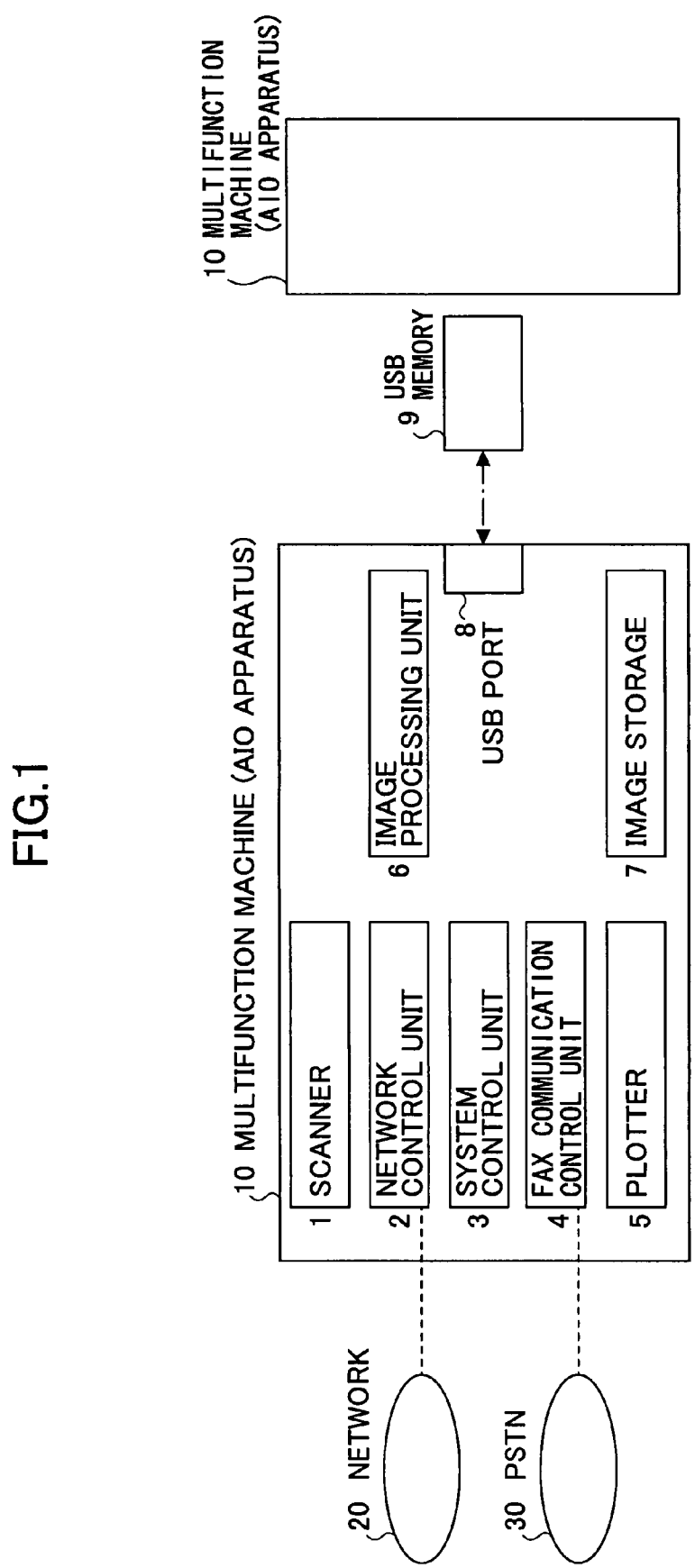
FIG. 1 is a block diagram of a multifunction machine (an AIO instrument) 10 according to an embodiment of the present invention.

FIG. 1 shows multifunction machines (AIO instruments) 10 and 11 according to the embodiment of the present invention. Here, since the configuration of the multifunction machine 11 is the same as the multifunction machine 10, descriptions follow only about the multifunction machine 10.

The multifunction machine 10 includes a scanner 1 for reading a document (a manuscript), a network control unit 2 for connecting to a network 20, for example, by LAN connections, and a system control unit 3 for controlling the multifunction machine 10. The system control unit 3 includes a RAM (random access memory), a ROM (read-only memory), an EEPROM (electrically rewritable and read-only memory), a CPU, and a timer circuit.

The multifunction machine 10 further includes a facsimile communication control unit 4 for connecting to a PSTN 30 and for carrying out control specified by various ITU recommendations. The multifunction machine 10 further includes a plotter 5 for printing the document and a report, an image processing unit 6 for converting a storing format of the document by compressing and expanding as required, and an image storage 7 for storing the document that may have been compressed.

The multifunction machine 10 further includes a USB port 8 for interfacing a USB memory 9.

Although the system control unit 3 carries out access when the USB memory 9 is attached according to the embodiment, it cannot be overemphasized that an interface of exclusive use may be used.

The multifunction machine 10 includes a system bus (not illustrated), to which are connected the scanner 1, the network control unit 2, the system control unit 3, the facsimile communication control unit 4, the plotter 5, the image processing unit 6, the image storage 7, and the USB port 8 so that data may be exchanged and an interruption signal may be input/output.

With the above configuration, the multifunction machine 10 manages an operation status of the multifunction machine 10, which operation status includes whether the USB memory 9 is attached/detached to/from the USB port 8.

The present invention is not limited by a form of detecting attaching/detaching the USB memory 9. The detection may be carried out, for example, by generating an interrupt signal at physical contact of the USB memory 9 when it is attached so that the system control unit 3 may detect the interrupt signal; and by changing a status of one of I/O ports of the system control unit 3 at physical contact of the USB memory 9 when it is attached so that the system control unit 3 may detect the change.

The system control unit 3 stores and manages use history of the USB memory 9 in the RAM and EEPROM of the system control unit 3. The contents of such use history are as shown in FIG. 2.

Figure 3:
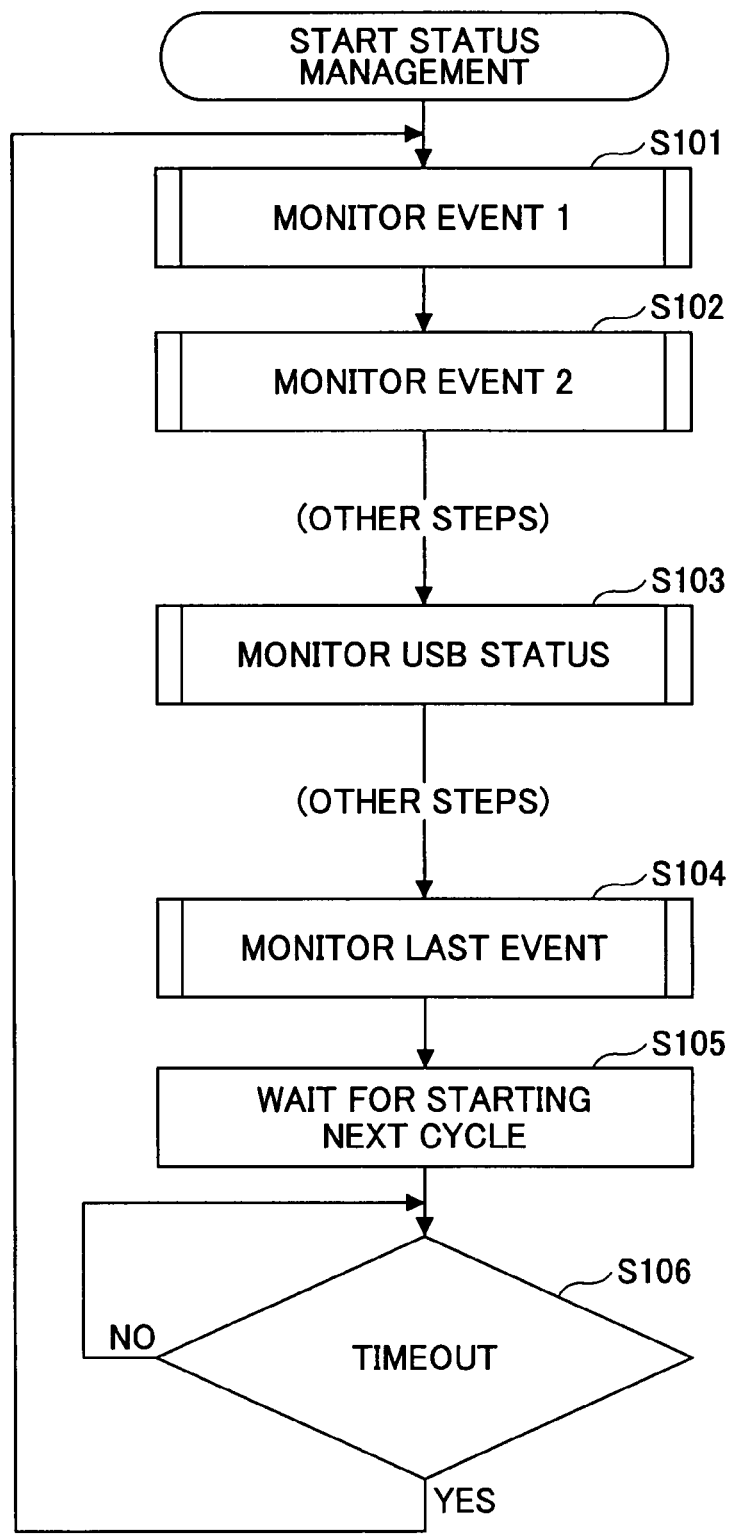
FIG. 3 is a flowchart of a status management process.

The system control unit 3 carries out a process of status management as shown in FIG. 3, and detects a status change of various functional units of the multifunction machine 10 by an event.

After the multifunction machine 10 is turned on, the status management process as shown in FIG. 3 is started. After the status management process is initialized, it can be called a periodic handler that is always managed.

In outline, two or more events are monitored one by one (S101, S102, S103, and S104). After monitoring is finished (S105), a timeout for a fixed period takes place (a loop of "No" at S106). When the fixed period expires ("Yes" at S106), the process returns to S101, and the process of monitoring the events one by one is repeated.

Step S103 is a process of detecting and monitoring attaching/detaching the USB memory 9 to/from the USB port 8.

Although specific contents of Event 1 at S101 are not described, Event 1 can be, for example, a step of determining whether toner is available, and turning on a light emitting diode for warning if no toner is available. The same applies to Event 2 at S102.

Figure 4:
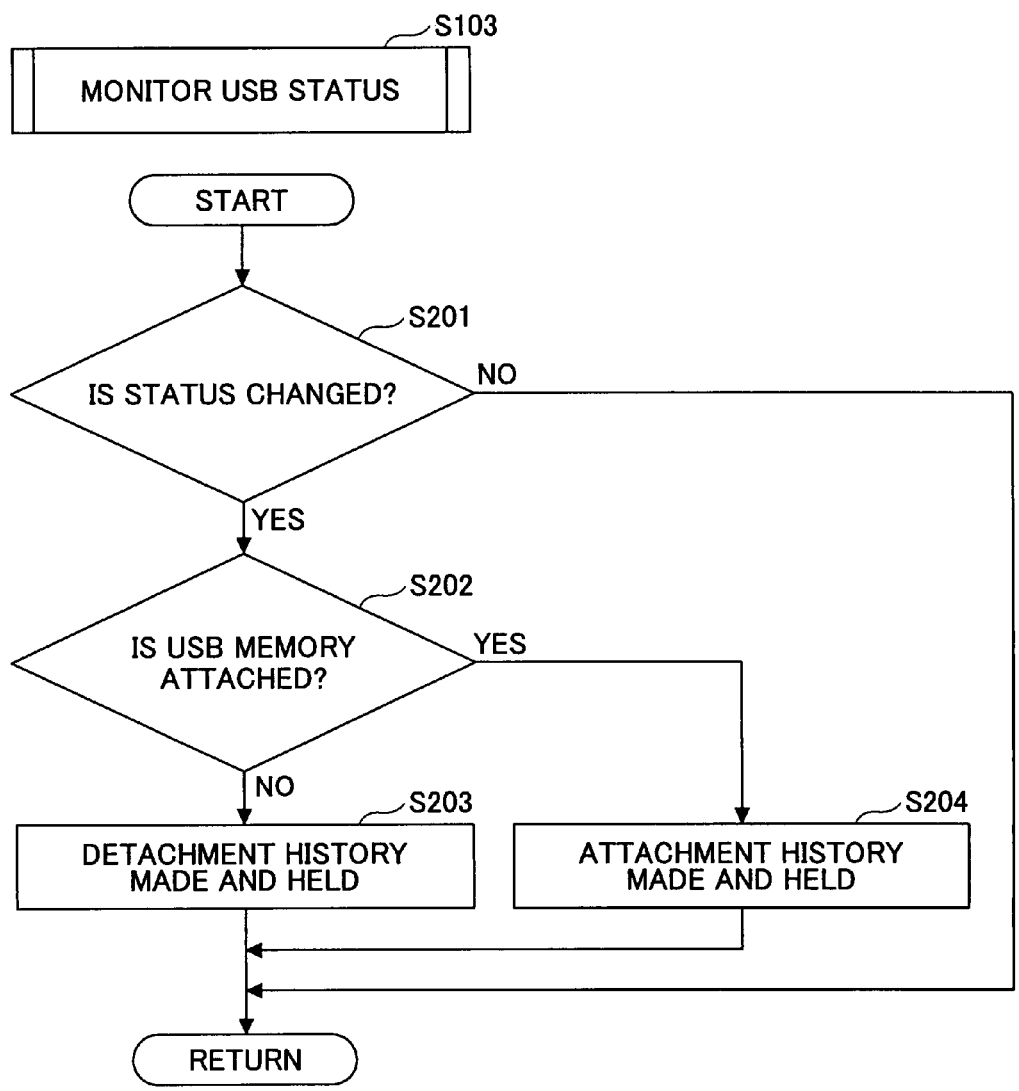
FIG. 4 is a flowchart of a USB condition monitoring process.

Details of the process at S103 are as shown in FIG. 4.

With reference to FIG. 4, the system control unit 3 stores a last detection result of the attachment status of the USB memory 9 to the USB port 8. If a new detection result is the same as the last detection result (No at S201), no further action is taken and the process is finished.

If the new detection result is different from the last detection result (Yes at S201), whether the USB memory 9 is attached is determined at S202. If affirmative (Yes at S202), attachment history is generated and held (S204). If negative (No at S202), detachment (removal) history is generated and held (S203).

The system control unit 3 acquires history information about attachment/detachment of the USB memory 9 at steps S204 or S203, as applicable. The history information is stored and managed in a non-volatile memory such as the EEPROM of the system control unit 3.

With reference to FIG. 2, an example (a) shows contents of the USB attachment/detachment history information.

In the example (a), date, time, and the attachment/detachment status are recorded at a fixed interval, which is 60 minutes. The interval can be adjusted as desired. Since the status is generally monitored at a short interval (for example, 1 second) the USB status can be detected and written in the attachment/detachment history at the adjusted interval.

With reference to FIG. 2, an example (b) shows the contents of the USB attachment/detachment history information.

According to the example (b), when the USB status is changed, the attachment/detachment history is written. Here, it is necessary to keep the last status.

The attachment/detachment history is the history information stored and managed about use of the USB memory 9, and may be presented on a display unit of the multifunction machine 10, by printing, and by an external instrument (for example, a PC) connected through the network 20 so that the traceability at the time of an information leak is improved.

Now, a stronger security measure is required of a multifunction machine such as the multifunction machine 10. Then, an authentication screen is displayed in a stand-by status that takes place when the multifunction machine 10 is turned on. A service (copying, facsimile transmission, mail transmission, etc.) is offered after user authentication is successful. When the service is completed, or when a fixed time passes without operation, the display returns to the authentication screen.

Generally, on the authentication screen, user identification information such as an ID and a password is required. The multifunction machine 10 collates the combination of the ID and the password with a user list beforehand stored so that user identification information such as a name is acquired from the user list. Here, the user information can also be read and stored with the history information as shown by an example (c) in FIG. 2.

The history information relevant to the USB memory 9 according to the example (c) contains date, time, attachment/detachment status, and user name at a predetermined interval, which is 60 minutes in this example. The interval can be adjusted as desired. Since the status is generally monitored at a short interval (for example, 1 second) the USB status can be detected and written in the attachment/detachment history at the adjusted interval. If the user is not identified, the history is written for an unnamed (uncertain) user.

According to an example (d), every time the USB status is changed, the fact is written in the attachment/detachment history. In this case, it is necessary to hold the last status. As a result, finer management than the example (c) is possible. The history information can be presented on the display unit of the multifunction machine 10, on paper by printing, or on a display unit of the external instrument (for example, a PC) connected through the network 20.

As described, the attachment/detachment history serving as the history information about use of the USB memory 9 is manageable in association with the user names.

Now, the danger of an information leak is high unless some restriction is provided concerning the use of a service for the USB memory 9 that is plugged in to the multifunction machine 10.

Figure 5:
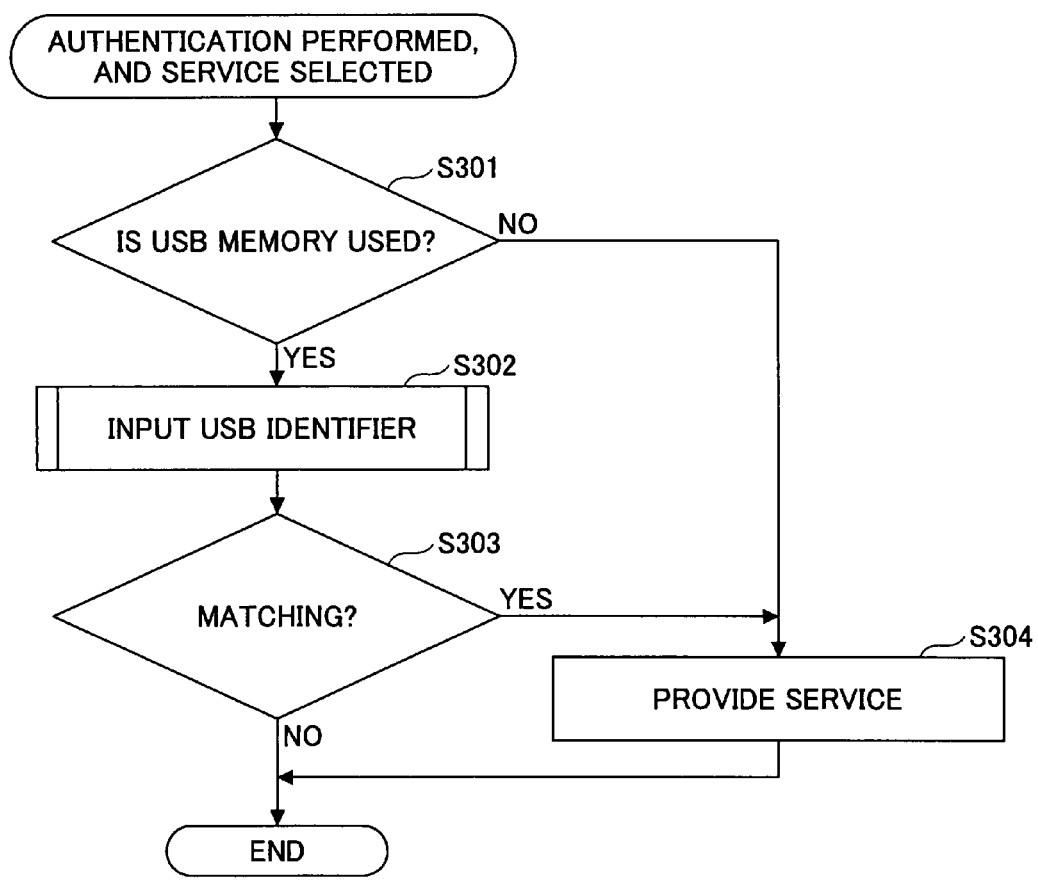
FIG. 5 is a flowchart of a process when authentication is carried out, and a service is selected.

In order to provide the restriction, a process shown in FIG. 5 can be carried out, wherein an identifier (identification information) A is written in the USB memory 9. When a user wishes to receive a service of the multifunction machine 10, authentication is carried out according to the process.

That is, when the user is identified and permitted to use, whether a service requested uses the USB memory 9 is determined. If the determination is negative (No at S301), the service is offered with no special restriction (S304). If the determination is affirmative (Yes at S301), the user is requested to input the identifier A (which an authorized person should know) (S302). Then, whether the input identifier agrees with the identifier A written in the USB memory 9 is determined (S303). If the determination is affirmative (Yes at S303), the requested service is offered. If the determination is negative (No at S303), the service is not offered, and the process is finished.

In the case where the determination is negative (No at S303), the process may return to S303 for a predetermined number of times for inputting the identifier.

In this way, the multifunction machine 10 is capable of denying a service using the USB memory 9 by an unauthorized person. Here, the process shown by FIG. 5 is an additive process in addition to the user authentication by the multifunction machine 10. Unauthorized use of the service using the USB memory 9 can be prevented by a simplified authentication that is specialized to the service using the USB memory 9, wherein only collation of the input identifier with the identifier written in the USB memory 9.

The process shown in FIG. 5 may further include a step of recording events concerning the service using the USB memory 9. The events may include the name of the user identified through the authentication, a name of the service using the USB memory 9, and a result of identifier matching test. These elements are associated with each other. In this case, the history information appears as shown by an example (e) in FIG. 2. According to the example (e), Person C was not able to receive a service of "USB To Print", while Person A received a service of "Scan To USB", and Person B received a service of "USB To Print". In the case of Person C, although the user passed the authentication, the user did not know the USB identifier. Accordingly, it is determined that spoofing takes place. In this way, the safety is increased.

If data are written in "plain text" to the USB memory 9, the written data may be abused and the safety of the service using the USB memory 8 is degraded.

Then, it is conceivable that contents of the data written to the USB memory 9 be encrypted with password protection.

In this case, an administrator of the multifunction machine 10 beforehand registers the password. The password is stored in the EEPROM of the system control unit 3, and the like.

Figure 6:
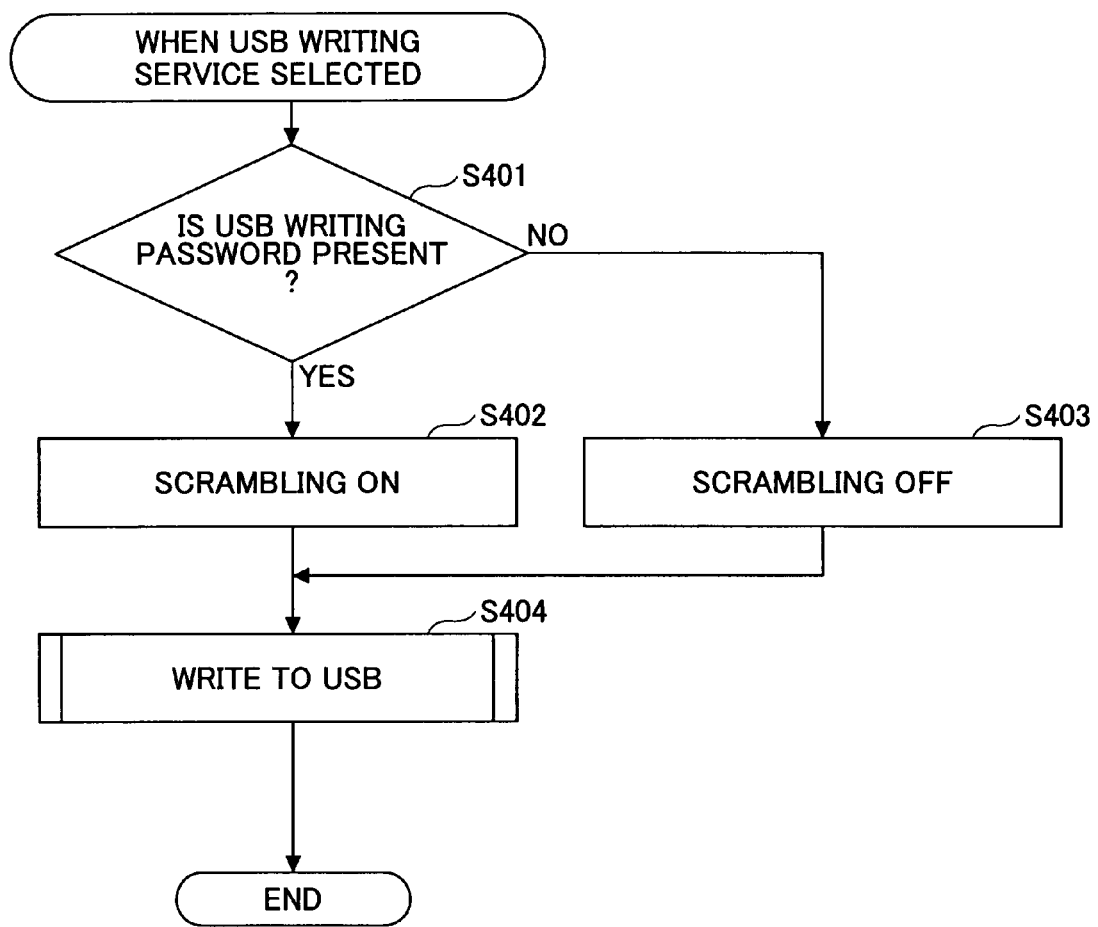
FIG. 6 is a flowchart of a process when a USB writing service is selected.

When executing a service accompanied by writing to the USB memory 9, a process as shown in FIG. 6 is carried out.

That is, whether a password of writing to the USB memory 9 is present is determined (S401). If affirmative (Yes at S401), scrambling is activated (ON at S402); otherwise, scrambling is deactivated (OFF at S403).

The data are written to the USB memory 9 (S404) according to the scrambling direction, ON or OFF. In addition, when writing to the USB memory 9, from a viewpoint of memory capacity saving, a compression process may be carried out whether scrambling is ON or OFF.

Since the scrambled data cannot be easily extracted even if the USB memory 9 is stolen, information security is increased.

Figure 7:
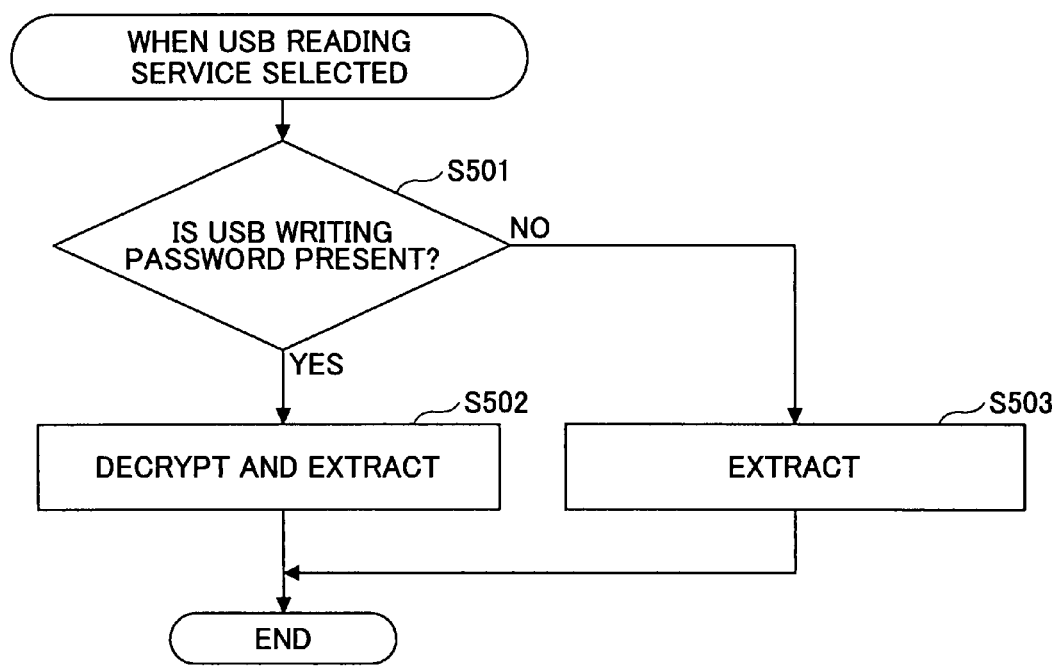
FIG. 7 is a flowchart of a process when a USB read-out service is selected.

When the data, whether scrambled or unscrambled (plain text), are read from the USB memory 9 by the multifunction machine 10 for a service using the USB memory 9, a process such as shown by FIG. 7 is carried out.

When a service accompanied by reading from the USB memory 9 is selected and carried out, whether a USB writing password is beforehand registered in the EEPROM of the system control unit 3, etc. is determined (S501). If affirmative, the scrambled data are decrypted and an original document is extracted (decoding/expansion) based on the password (S502). Otherwise, i.e., if there is no password, usual extraction (decoding/expansion) without decryption is carried out (S503). If the data are encrypted by a password registered in another instrument such as the multifunction machine 11, the data cannot be decrypted at step S503 of the multifunction machine 10.

As a result, while the document written in the USB memory 9 using the USB writing password by the multifunction machine 10 can be properly extracted by the same multifunction machine 10, the document cannot be extracted by other apparatuses. Accordingly, security of data handled by the multifunction machine 10 is increased.

When the multifunction machine 10 offers a service that uses the USB memory 9, the history information on USB use may look like an example (f) in FIG. 2. There, the user (user name) identified through the authentication, the name of the offered service, a result of USB identifier input (match or un-match), and whether data are encrypted are contained.

According to the example (f), Person A carried out "Scan To USB" service with scrambling, Person B carried out "USB To Print" service with scrambling, and Person C was not able to receive "USB To Print" service due to non-matching of the USB identifier.

As a result, even if the authentication is passed, spoofing (in this example, Person C) for a service using the USB memory is prevented, and the security is increased. Further, even if Persons A, B, and C write encrypted documents into the USB memory 9 with the password registered in the multifunction machine 10, and the USB memory 9 is taken out, the encrypted documents cannot be decrypted unless the password is known and an apparatus capable of properly decrypting the document is available. As described above, when a problem occurs, it is possible to pursue the case with the history information.

One password serving as a key for encryption at the time of the writing to the USB memory 9 may be assigned to the multifunction machine 10 for all encrypting transactions; or alternatively, each document to be written in the USB memory 9 may be assigned a unique password.

In the latter case, a user can individually register a password when writing to the USB memory 9 in the service accompanied by the writing to the USB memory 9.

Figure 8:
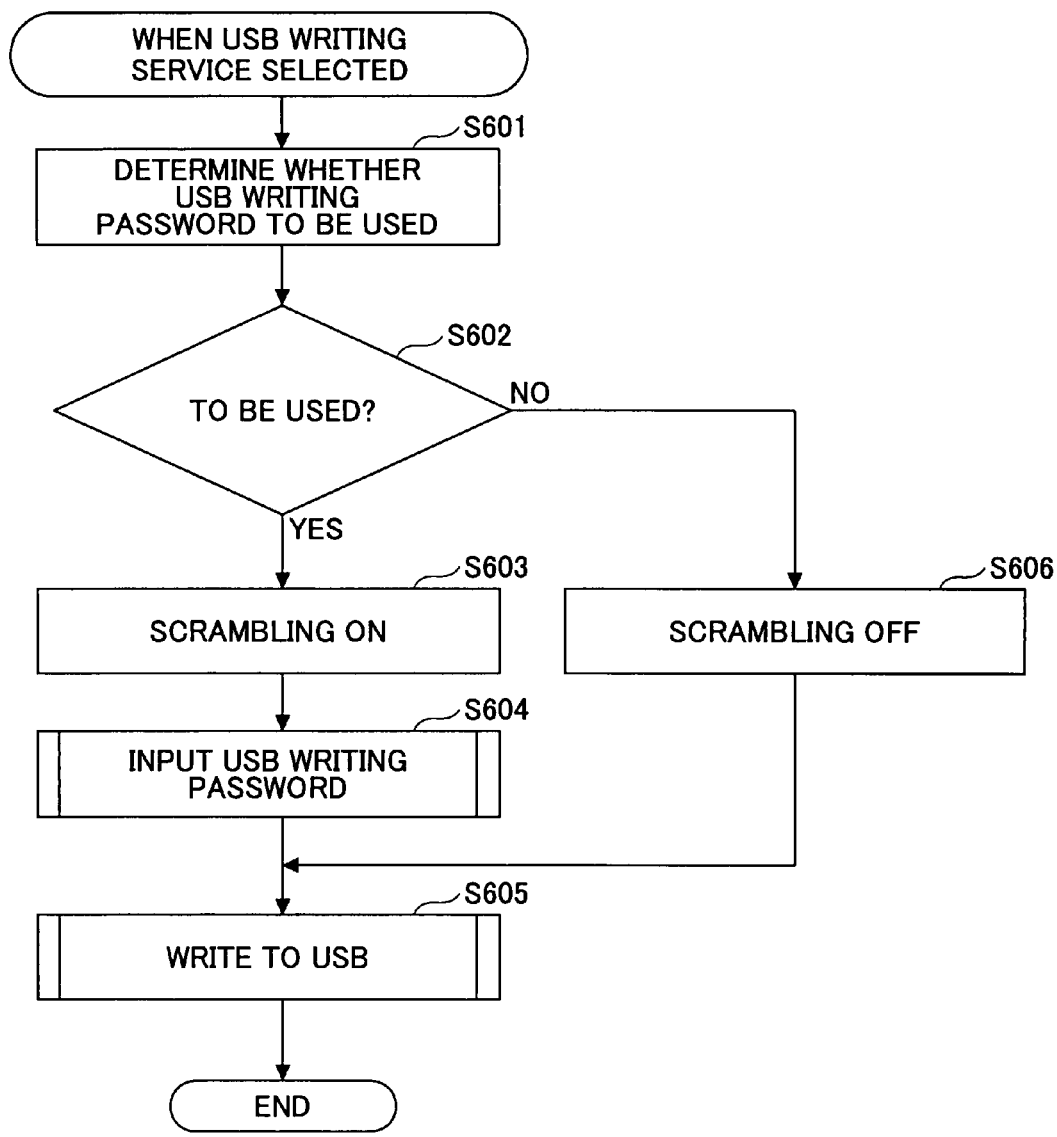
FIG. 8 is a flowchart of another process when the USB writing service is selected.

That is, with reference to FIG. 8, when a service accompanied by writing to the USB memory 9 is selected, whether the user wishes to use a USB writing password is determined (S601). If the determination is negative (No at S602), scrambling is turned off (S606). If the determination is affirmative (Yes at S602), scrambling is turned on (S603). Then, the user inputs the USB writing password for writing to the USB memory 9 (S604), and the process proceeds to S605 where writing to the USB memory 9 is carried out.

Writing to the USB memory 9 at S605 is carried out based on the scrambling direction, i.e., ON or OFF. As a result, the USB writing password can be set up for every writing transaction to the USB memory 9, and the document is scrambled (encrypted). In this way, even if the USB memory 9 is stolen, the encrypted document cannot be easily decrypted, and the information security is obtained. Further, the information security is enhanced by that a setup does not remain in the instrument.

In the case where one USB writing password is registered in the multifunction machine 10 for all the encrypting transactions such that data are encrypted based on the password and written in the USB memory 9, the password may be written into the USB memory 9.

Figure 9:
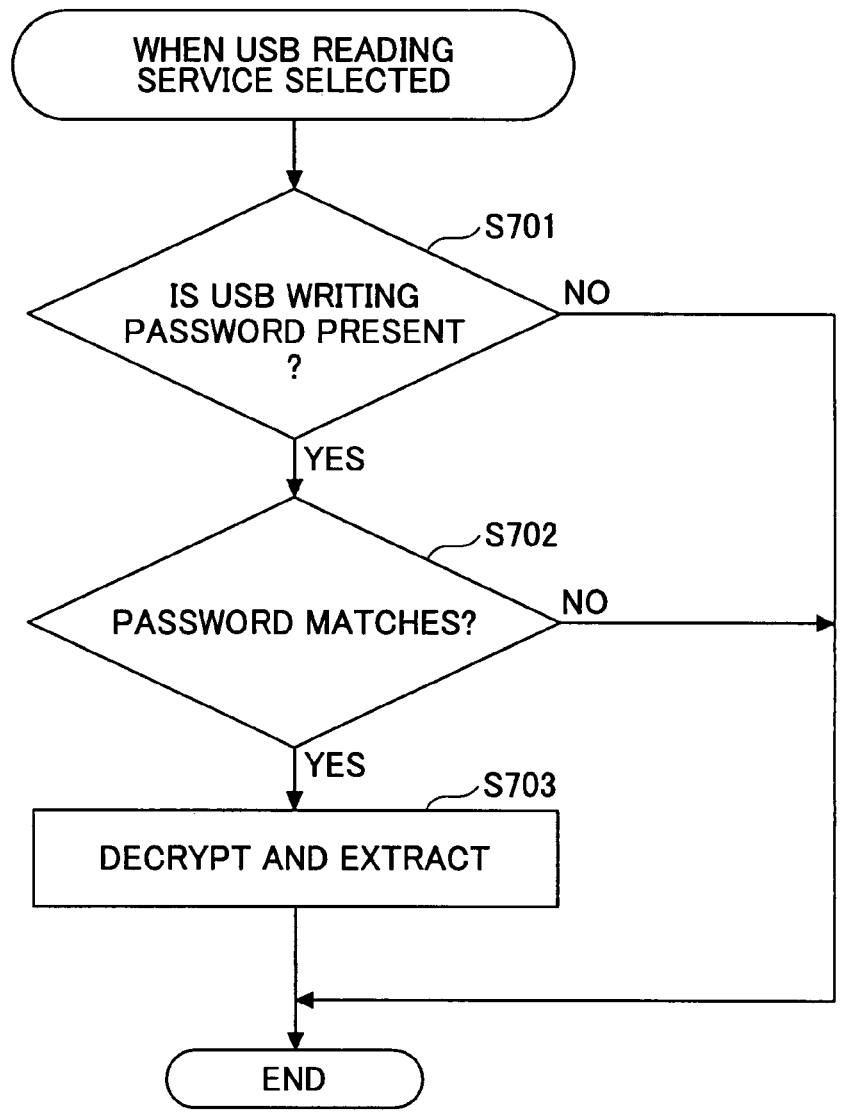
FIG. 9 is a flowchart of another process when the USB read-out service is selected.

When the password for all the encrypting transactions is stored in the USB memory 9 with an encrypted document, a process such as shown in FIG. 9 is carried out when the multifunction machine 10 reads the data.

With reference to FIG. 9, when reading the document written in the USB memory 9, whether the password for all the encrypting transactions is stored in the EEPROM, etc., of the system control unit of the multifunction machine 10 is determined (S701). If the determination is negative (No at 701), no further action takes place, but the process is finished.

If the determination is affirmative (Yes at S701), the password is compared with the password written in the USB memory 9 (S702). If the determination is affirmative (Yes at S702), the document is decrypted and extracted (S703). Otherwise (No at S702), no further action takes place, but the process is finished.

As described, password comparison is carried out in two stages, and the information security is improved.

Figure 10:
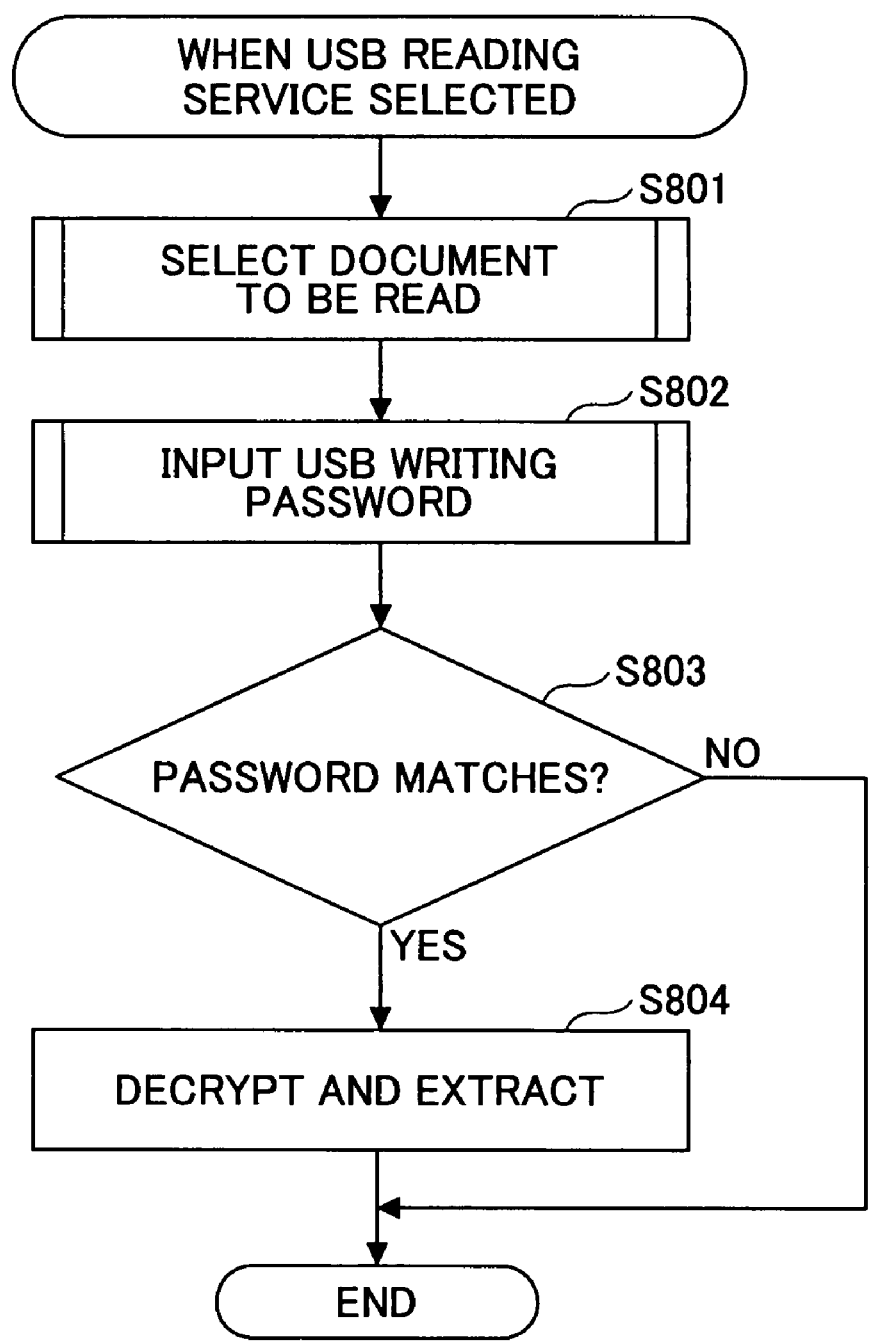
FIG. 10 is a flowchart of another process when the USB read-out service is selected.

Further, when the document that is individually encrypted and stored in the USB memory 9 according to the process shown in FIG. 8 is to be read, a process as shown in FIG. 10 is carried out.

With reference to FIG. 10, the user is to identify a document to be read from a list of documents that are individually encrypted and stored in the USB memory 9 (S801). Next, the user is to input the password (S802). Whether the input password agrees with the password written in the USB memory 9 is determined. If the determination is negative (No at S803), no action is taken, and the process is finished; alternatively, password inputting may be prompted for a predetermined number of times. If the determination is affirmative (Yes at S803), the document is extracted and decrypted (S804).

As described, password comparison is carried out in two stages, and the information security is improved.

When instruments are interconnected by the network 20, it is commonly known that management of the instruments can be carried out by an external apparatus such as a PC. Accordingly, the history information relevant to use of the USB memory 9 in the multifunction machine 10 may be carried out through the network 20.

Specifically, the password used by the multifunction machine 10 in all the encrypting transactions for writing into the USB memory 9 may be stored in an external apparatus connected through the network 20, and further the history information that should be managed may also be stored in the external apparatus connected through the network 20. In this way, management of the history relevant to use of the USB memory 9 can be carried out by accessing the external apparatus through the network 20 when required.

The password used in all the encryption transactions for writing into the USB memory 9 may be registered in the external apparatus, and an arrangement is made such that the multifunction machine 10 acquires the password when required. Alternatively, the registration is carried out by the multifunction machine 10, and provided to the external apparatus such that the password may be referenced to when required. The same is applicable to the history information in the various forms shown in FIG. 2 relevant to use of the USB memory 9. Further, when the external apparatus is used through the network 20, the external apparatus becomes capable of managing the history information and the password used for all the encryption transactions of not only the multifunction machine 10 but also other apparatuses.

Further, the present invention is not limited to these embodiments, but variations and modifications may be made without departing from the scope of the present invention.

The present application is based on Japanese Priority Application No. 2006-252852 filed on Sep. 19, 2006 with the Japanese Patent Office, the entire contents of which are hereby incorporated by reference.

What is claimed is:

1. A multifunction machine including an interface unit for controlling a USB, comprising:
    a management unit configured to manage history information that includes information about use of a USB memory attached to and detached from the interface unit, with the history information being retained in the multifunction machine after the USB memory is detached from the interface unit; and
    a detecting unit configured to detect a status of the USB memory and user identification information that identifies a user of a service of the multifunction machine, where the detecting unit detects the status and the user identification information at fixed time intervals and when the status of the USB memory changes, with the status of the USB memory indicating whether the USB memory is attached to the interface unit, and with the service requiring the USB memory, wherein
    the history information managed by the management unit further includes information about the status of the USB memory and the user identification information detected by the detecting unit.

2. The multifunction machine of claim 1, wherein,
    identification information is written beforehand in the USB memory, and
    a user inputs an identifier prior to receiving a service of the multifunction machine that uses the USB memory, where the input identifier is compared with the identification information and the service is provided only when the input identifier matches with the identification information.

3. The multifunction machine of claim 2, wherein the history information includes at least one of information about a collation result of the identification information collated with the input identifier and information about a kind of service that is related to the USB memory.

4. The multifunction machine of claim 1, wherein the history information includes at least one of information about a collation result of the identification information collated with the input identifier and information about a kind of service that is related to the USB memory.

5. A method of controlling a multifunction machine including an interface unit for controlling a USB, comprising:
    managing history information that includes information about use of a USB memory attached to and detached from the interface unit, with the history information being retained in the multifunction machine after the USB memory is detached from the interface unit; and
    detecting a status of the USB memory and user identification information that identifies a user of a service of the multifunction machine, where the detecting unit detects the status and the user identification information at fixed time intervals and when the status of the USB memory changes, with the status of the USB memory indicating whether the USB memory is attached to the interface unit, and with the service requiring the USB memory, wherein
    the history information managed by the management unit further includes information about the status of the USB memory and the user identification information detected by the detecting unit.

6. The method of claim 5, wherein,
    identification information is written beforehand in the USB memory, and
    a user inputs an identifier prior to receiving a service of the multifunction machine that uses the USB memory, where the input identifier is compared with the identification information and the service is provided only when the input identifier matches with the identification information.

7. The method of claim 6, wherein the history information includes at least one of information about a collation result of the identification information collated with the input identifier, and information about a kind of service that is related to the USB memory.

8. The method of claim 5, wherein the history information includes at least one of information about a collation result of the identification information collated with the input identifier, and information about a kind of service that is related to the USB memory.

* * * * *